US010587428B2

(12) United States Patent
Kawada

(10) Patent No.: US 10,587,428 B2
(45) Date of Patent: Mar. 10, 2020

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Kunihiro Kawada, Niigata (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 15/878,180

(22) Filed: Jan. 23, 2018

(65) Prior Publication Data
US 2018/0219692 A1 Aug. 2, 2018

(30) Foreign Application Priority Data
Jan. 27, 2017 (JP) .................................. 2017-012852

(51) Int. Cl.
*H04L 12/28* (2006.01)
*H04L 12/18* (2006.01)
*H04W 48/16* (2009.01)
*H04W 52/02* (2009.01)
*H04W 8/00* (2009.01)

(52) U.S. Cl.
CPC ........ *H04L 12/185* (2013.01); *H04L 12/1877* (2013.01); *H04W 48/16* (2013.01); *H04W 52/028* (2013.01); *H04W 52/0219* (2013.01); *H04W 52/0229* (2013.01); *H04W 8/005* (2013.01); *Y02D 70/00* (2018.01); *Y02D 70/142* (2018.01)

(58) Field of Classification Search
CPC ............. H04L 12/185; H04L 12/1877; H04W 52/0219; H04W 52/028; H04W 52/0229; H04W 48/16; H04W 8/005; Y02D 70/00; Y02D 70/142
USPC ......................................................... 370/390
See application file for complete search history.

(56) References Cited

U.S. PATENT DOCUMENTS

| | | | | |
|---|---|---|---|---|
| 2001/0053156 A1* | 12/2001 | Higuchi | .................. | H04L 12/18 370/466 |
| 2005/0249213 A1* | 11/2005 | Higuchi | .................. | H04L 12/18 370/390 |
| 2006/0036733 A1* | 2/2006 | Fujimoto | ............ | H04L 61/2015 709/225 |
| 2016/0020915 A1* | 1/2016 | Anggawijaya | ........ | H04L 12/185 370/390 |

FOREIGN PATENT DOCUMENTS

JP 2010-124331 A 6/2010

* cited by examiner

*Primary Examiner* — Chuong T Ho
(74) *Attorney, Agent, or Firm* — Canon U.S.A., Inc. IP Division

(57) ABSTRACT

In a case where a signal received while a communication apparatus is in a power saving state is a multicast listener query signal, whether a multicast address of the signal matches a predetermined address of a multicast group joined by the communication apparatus is determined. In a case where the signal matches, a multicast receiver report is transmitted to a source of the multicast listener query signal.

20 Claims, 7 Drawing Sheets

COMMUNICATION APPARATUS, METHOD FOR CONTROLLING COMMUNICATION APPARATUS, AND STORAGE MEDIUM

BACKGROUND OF THE INVENTION

Field of the Invention

One disclosed aspect of the embodiments relates to a communication apparatus, a method for controlling a communication apparatus, and a storage medium.

Description of the Related Art

Demands for power saving have ever been increasing lately. In this context, many apparatuses have a mechanism of transitioning to a power saving mode and to a normal mode. The transition to the normal mode occurs when a job requiring the normal mode occurs. The power saving mode features a low power consumption amount in an unused state. The normal mode is an operating state involving a normal amount of power consumption. A dedicated remote controller has been widely used for remotely causing such an apparatus to transition to the normal mode, using an infrared communication function or the like. Some recently available apparatuses, with a network communication function using a wired local area network (LAN) or a wireless LAN, can be remotely transitioned to the normal mode using the network communication function.

Some apparatuses in the power saving mode transition to the power saving state with clock speeds reduced, so that all the functions can operate but with lower performance. Some apparatuses in the power saving mode have power and clock supply stopped to components other than a network communication function unit and have a memory only partially usable, for more power savings. In the latter configuration, a program size used in the power saving mode needs to be designed to be small, making only a part of the network communication function remaining active in the power saving mode.

A protocol known as Internet Protocol Version 6 (IPv6) features address autoconfiguration involving duplicate address detection. The duplicate address detection uses a solicited-node multicast address that is one of multicast addresses. The communication apparatus on a listener side uses a multicast group management protocol known as Multicast Listener Discovery (MLD), to use a multicast address. The communication apparatus on the listener side needs to notify a router or an MLD snoop switch of an intention to receive the multicast address, by using the MLD. The MLD includes functions of joining, maintaining, and leaving a multicast group. Multicast Listener Discovery Version 2 (MLDv2) further includes a function for managing an address indicating a multicast packet source.

Japanese Patent Application Laid-Open No. 2010-124331 discusses a technique related to operation control during the power saving mode. In Japanese Patent Application Laid-Open No. 2010-124331, a wireless communication function is turned ON and OFF at a predetermined interval during the power saving mode. An apparatus discussed in Japanese Patent Application Laid-Open No. 2010-124331 transmits a join packet using the MLD when the wireless communication function turns ON to receive the multicast packet while being in the power saving mode.

However, the apparatus discussed in Japanese Patent Application Laid-Open No. 2010-124331 transmits no join packet using the MLD while the wireless communication function is OFF. Thus, the apparatus discussed in Japanese Patent Application Laid-Open No. 2010-124331 might fail to respond to a packet for maintaining a multicast group, periodically transmitted by the router, when the wireless communication function turns OFF after the join packet has been transmitted to the router. If the packet for maintaining the multicast group is met with no response, it is determined that there is no listener node (apparatus). As a result, the multicast packet might be blocked (might not be transmitted) depending on a configuration of the MLD snoop switch provided between the apparatus and the router. In other words, the apparatus discussed in Japanese Patent Application Laid-Open No. 2010-124331 might fail to maintain the multicast group.

When the multicast packet is blocked during the power saving mode, the duplicate address detection might not work. When the duplicate address detection does not work, the network might fall in a state of having a plurality of apparatuses with the same IPv6 address, resulting in a failure to properly communicate using IPv6.

The MLD involves a large amount of functions and parameters. Thus, a large amount of resources is required to keep all the functions, required for maintaining the multicast group, active in the power saving mode.

SUMMARY OF THE INVENTION

One disclosed aspect of the embodiments is directed to providing a communication apparatus that can efficiently maintain a multicast group during a power saving mode (or power saving state).

A communication apparatus has a first state and a second state involving smaller power consumption than in the first state. The apparatus includes a reception unit, a first determination unit, a second determination unit, and a transmission unit. The reception unit is configured to receive a signal from outside in the second state. The first determination unit is configured to determine whether the received signal is a multicast listener query signal. The second determination unit is configured to determine, in a case where the received signal is determined to be the multicast listener query signal, whether a multicast address of the multicast listener query signal matches a predetermined address of a multicast group joined by the communication apparatus. The transmission unit is configured to transmit, in a case where the multicast address is determined to match the predetermined address, a multicast receiver report to a source of the multicast listener query signal.

Further features of the disclosure will become apparent from the following description of exemplary embodiments with reference to the attached drawings.

DESCRIPTION OF THE EMBODIMENTS

Figure 1:
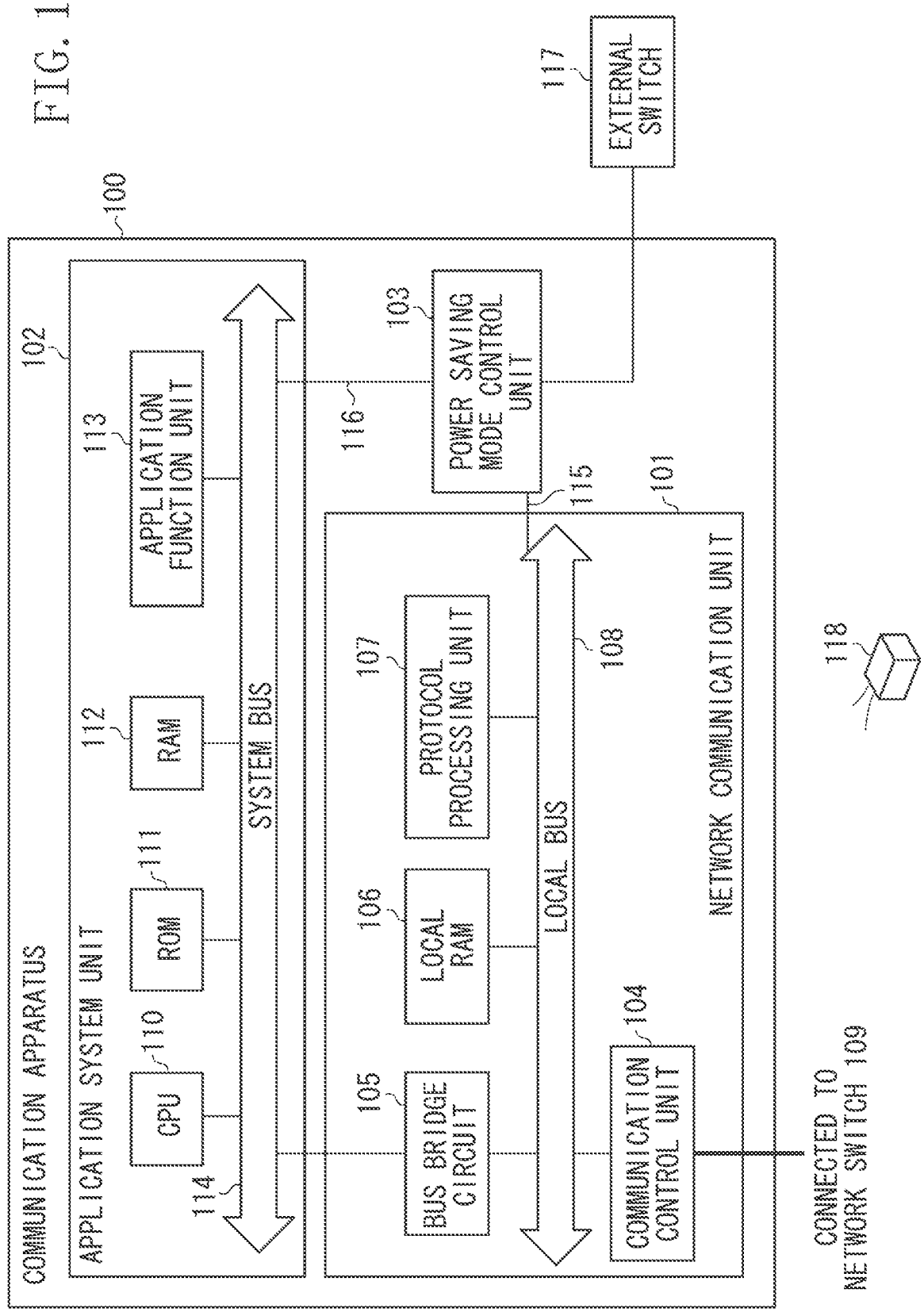
FIG. 1 is a diagram illustrating a configuration of a communication apparatus according to a first exemplary embodiment.

An exemplary embodiment is described in detail below with reference to the attached drawings. Configurations described in the exemplary embodiment are merely exemplary, and the disclosure is not limited to illustrated configurations. The technical scope of the disclosure is defined by the scope of claims, and not by the exemplary embodiment. The configuration according to the exemplary embodiment may be corrected or modified as appropriate in accordance with specifications and various conditions (such as a use condition and a used environment) of an apparatus to which the disclosure is applied.

<Configuration of Communication Apparatus>

An example of a configuration of a communication apparatus 100 according to a first exemplary embodiment is described with reference to FIG. 1.

The communication apparatus 100 includes a network communication unit 101, an application system unit 102, and a power saving mode control unit 103.

The network communication unit 101 includes a communication control unit 104, a bus bridge circuit 105, a local random access memory (RAM) 106, and a protocol processing unit 107. The components of the network communication unit 101 are connected to each other via a local bus 108. The communication apparatus 100 is connected to a network switch 109 via the communication control unit 104.

The power saving mode control unit 103 is a power supply control unit that independently controls power supplied to the network communication unit 101 and to the application system unit 102. The power saving mode control unit 103 performs power input control and hardware reset control for the network communication unit 101 and the application system unit 102. The power saving mode control unit 103 performs sequence control for safely starting and stopping the entire communication apparatus 100. The power saving mode control unit 103 is connected to the network communication unit 101 and the application system unit 102 via control signal lines 115 and 116, and performs control for a mode transition operation for transitioning between a normal mode (normal power state) and a power saving mode (power saving state). The power saving mode control unit 103 is connected to an external switch 117 operated by a user.

The communication control unit 104 is connected to the network switch 109 and transmits and receives a transmission frame to and from the network switch 109. For example, the communication control unit 104 performs a Media Access Control (MAC) process using Ethernet® (transmission medium control process) and transmission and reception of a transmission frame. The bus bridge circuit 105 is connected to the local bus 108 of the network communication unit 101 and a system bus 114 of the application system unit 102, so that data can be transferred between the local bus 108 and the system bus 114. In other words, the network communication unit 101 and the application system unit 102 have the local bus 108 and the system bus 114 connected with each other, to output and receive communication data to and from each other through bus-to-bus transfer.

The local RAM 106 serves as a temporary storage apparatus for processing executed in the network communication unit 101. More specifically, the local RAM 106 is used as a temporary data storage area by the communication control unit 104 and the protocol processing unit 107. In a case where the protocol processing unit 107 includes a microprocessor, the local RAM 106 can be used as a storage area for a program used for operating the protocol processing unit 107. The local RAM 106 includes a plurality of memory banks. Power supply to each of the memory banks can be independently controlled. The local RAM 106 may include a plurality of memory chips with different memory sizes, switched to one from another depending on a required memory size.

The protocol processing unit 107 is a hardware circuit device dedicated for a communication protocol processing or a microprocessor designed for the communication protocol processing. The protocol processing unit 107 executes general Transmission Control Protocol (TCP)/Internet Protocol (IP) communication processing. More specifically, the protocol processing unit 107 performs communication protocol processing for each of Internet Protocol Version 4 (IPv4), IPv6, Security Architecture for Internet Protocol (IPsec), Internet Control Message Protocol (ICMP), User Datagram Protocol (UDP), and TCP, as well as transmission flow control, congestion control, communication error control, and the like. The protocol processing unit 107 can include a single functional block or a multiprocessor that executes a plurality of functions using a plurality of microprocessors. The protocol processing unit 107 can be configured to execute processing with a microprocessor and implement some of the functions with hardware (hardware acceleration). In the configuration, preferably, power supply to each of the microprocessor and the hardware is independently controllable.

A remote controller 118 that operates the communication apparatus 100 performs communications, using the TCP/IP protocol, via the network switch 109.

The application system unit 102 includes a central processing unit (CPU) or a processor 110, a read only memory (ROM) 111, a RAM 112, and an application function unit 113. The components of the application system unit 102 are connected with each other via the system bus 114.

The ROM 111 stores therein a system program.

The RAM 112 is a temporary storage apparatus used for executing system software or application software. For example, the RAM 112 stores therein an interface address. A program or a set of instructions is loaded onto the RAM 112 from the ROM 111, and is executed by the CPU 110. The program or the set of instructions, when executed, causes the CPU to perform operations described in the following.

The application function unit 113 is a hardware processing unit used for implementing an application function of the communication apparatus 100.

The application system unit 102 implements main functions (such as a function implemented by executing an application program) of the communication apparatus 100. The CPU 110 executes an application program enabling network communications. The network communications performed with the application program are based on the TCP/IP protocol. The network communication unit 101 executes the TCP/IP protocol processing.

Although not illustrated in the figure, the communication apparatus 100 includes a duplicate address detection timer, a wake-up timer, and a transmission timer. The communication apparatus 100 needs to at least include the configuration illustrated in FIG. 1, and can further include other configurations. The communication apparatus 100 can be any apparatus including a projector, a personal computer (PC), a tablet terminal, a smartphone, a digital camera, and a printer.

<Transition to Power Saving Mode>

The communication apparatus 100 having the configuration described above can transition to a power saving mode in an idle state with the main functions not operating. The transition to the power saving mode is described with reference to FIG. 2. In the power saving mode according to the present exemplary embodiment, the application system unit 102 is in a power OFF state.

Figure 2:
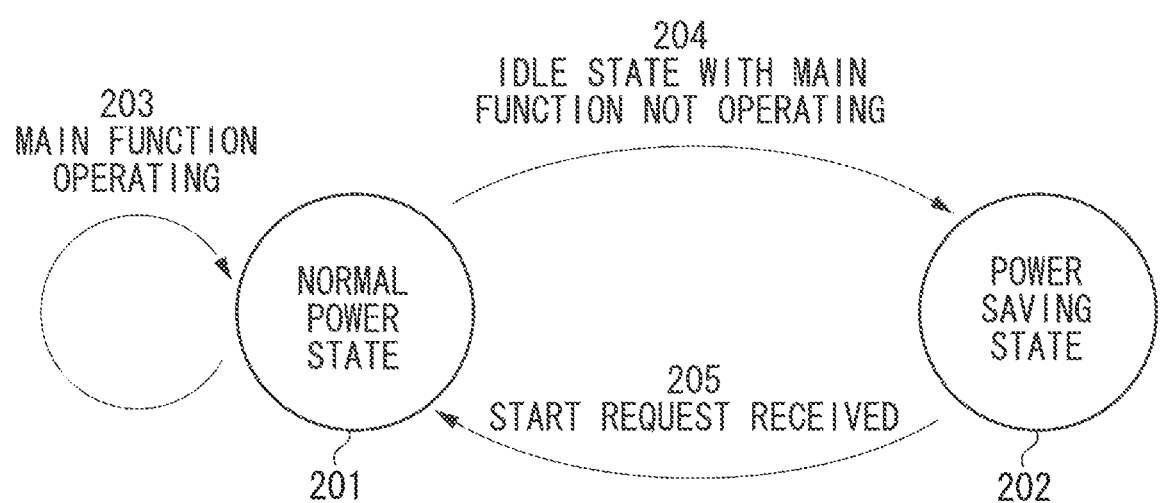
FIG. 2 is a diagram illustrating how a power consumption state of the communication apparatus according to the first exemplary embodiment transitions.

FIG. 2 is a diagram (schematic view) illustrating how the communication apparatus 100 transitions between power consumption states including a normal power state (normal mode) 201 and a power saving state (power saving mode) 202. The normal power state 201 is maintained as long as the main functions of the communication apparatus 100 are operating (203). In the normal power state 201, power is supplied to the entire communication apparatus 100 including the application system unit 102. When the idle state with the main functions not operating is established while the apparatus is in the normal power state 201, the normal power state 201 transitions to the power saving state 202 (204).

For example, the RAM 112 stores information (for example, an interface address) on a multicast group joined by the communication apparatus 100 in the normal power state 201. When the normal power state 201 transitions to the power saving state 202, the information on the multicast group stored in the RAM 112 is further stored in the local RAM 106. In other words, the transition from the normal power state 201 to the power saving state 202 involves transferring of the information on the multicast group from the application system unit 102 to the network communication unit 101. For example, the communication control unit 104 of the network communication unit 101 is in charge of such transferring.

In the power saving state 202, only the network communication unit 101 and the power saving mode control unit 103 receive the power. The network communication unit 101 is controlled in detail by the power saving mode control unit 103 so that the power is only supplied to required hardware resources in accordance with an operation mode. In the power saving state 202, the application system unit 102 is in the power OFF state with the system bus 114, the CPU 110, the ROM 111, and the RAM 112 not operating. In the power saving state 202, the power is supplied to the network communication unit 101 so that an external signal (a packet for example) can always be received.

For example, the transition from the power saving state 202 to the normal power state 201 occurs when the communication apparatus 100 receives a system start request from the network switch 109 (205 in FIG. 2). The transition from the power saving state 202 to the normal power state 201 can also be performed by pressing the external switch 117 connected to the power saving mode control unit 103.

A multicast listener report, indicating termination of multicast reception by the communication apparatus 100, is transmitted in the normal power state 201. A multicast listener report, indicating a change in a multicast group joined by the communication apparatus 100, is also transmitted in the normal power state 201. The normal power state 201 and the power saving state 202 are examples of a first state and a second state of a communication apparatus, respectively. However, the first state and the second state are respectively not limited to the normal power state and the power saving state, as long as the first state involves larger power consumption than the second state.

<Network Configuration>

Figure 3:
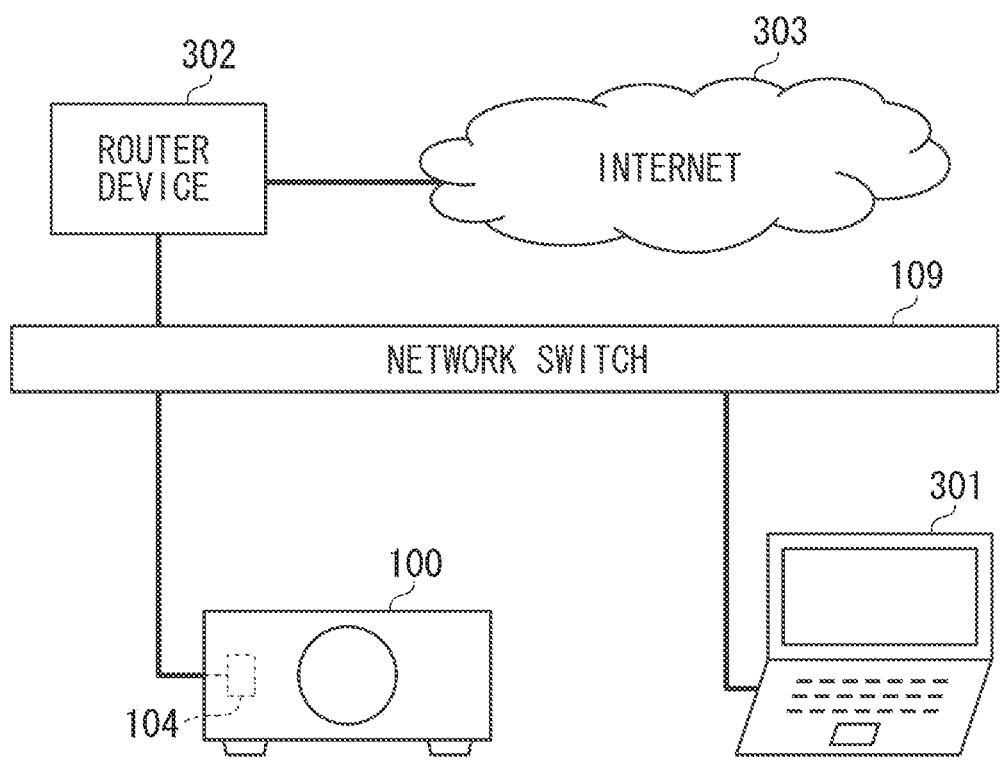
FIG. 3 is a diagram illustrating a network configuration according to the first exemplary embodiment.

A network configuration according to the present exemplary embodiment is described with reference to FIG. 3. The network includes the communication apparatus 100, the network switch 109, a PC 301, a router device 302, and the Internet 303.

The communication apparatus 100 is connected to the network switch 109 via the communication control unit 104. The network switch 109 supports Multicast Listener Discovery (MLD) snooping. The PC 301 is also connected to the network switch 109. The router apparatus 302 is also connected to the network switch 109. The router apparatus 302 is also connected to the Internet 303. In the present exemplary embodiment, the router device 302 is used as a multicast router. The communication apparatus 100 and the PC 301 each support IPv6. Thus, when the communication apparatus 100 is connected to the network switch 109, the CPU 110 of the communication apparatus 100 sets an IPv6 interface address. The PC 301 is an example of an apparatus that is a part of the multicast group also joined by the communication apparatus 100.

<Operation of MLD Snoop Switch>

An operation of an MLD snoop switch is described.

The network switch 109, which supports the MLD snooping, functions as the MLD snoop switch. The network switch 109 monitors exchange of packets (signals) of MLD that is a multicast group management protocol. In the network configuration illustrated in FIG. 3, the router apparatus 302 periodically transmits a multicast listener query packet to the communication apparatus 100 and the PC 301. An apparatus (the communication apparatus 100 and the PC 301) that is connected to the network switch 109 and is in the multicast group transmits a multicast listener report to the router apparatus 302 upon receiving the multicast listener query packet. Upon detecting the transmission of the multicast listener report, the network switch 109 stores multicast address information and a port number attached to the multicast listener report. The network switch 109 performs control in such a manner that a packet addressed to the multicast address is transmitted to a predetermined port number. The multicast listener query packet is an example of a signal for a multicast listener query.

How the MLD snoop switch is configured is not specifically defined. Depending on how the network switch 109 is configured, only a multicast packet addressed to all of node multicast addresses might be transmitted to a port (apparatus) that does not transmit the multicast listener report as a response. In a case where the communication apparatus 100 in the power saving state does not respond to the multicast listener query packet, duplicate address detection might not work, resulting in a risk of failure to appropriately perform communications using IPv6.

<Address Setting Processing in Normal Mode>

Figure 4:
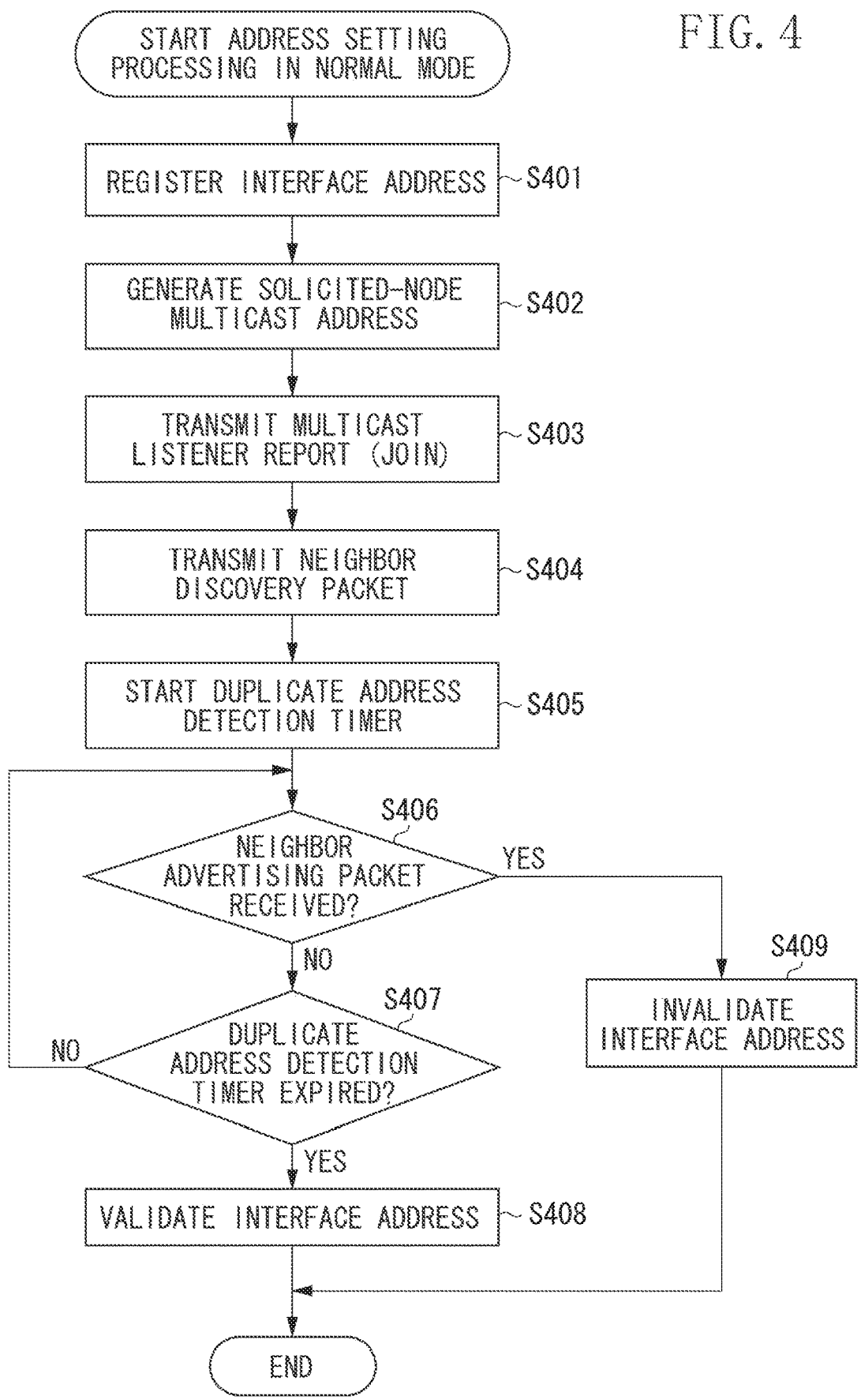
FIG. 4 is a flowchart illustrating interface address setting processing in a normal power state.

Address setting processing in the normal mode (normal power state) is described with reference to FIG. 4.

In step S401, the communication apparatus 100 registers a link local address, serving as an interface address, in the application system unit 102. For example, the interface address thus registered is stored in the RAM 112. At this point, the duplicate address detection is not performed yet, and thus the interface address thus registered cannot be used for communications.

In step S402, the communication apparatus 100 generates a solicited-node multicast address based on the interface address registered in step S401. The solicited-node multicast address is generated as a combination of a 104-bit multicast prefix (ff02:0:0:0:0:1:ff00::1/104) and lower 24 bits of the interface address registered in step S401. As a result, the communication apparatus 100 can receive a packet addressed to the solicited-node multicast address.

In step S403, the communication apparatus 100 transmits a multicast listener report (join), for the solicited-node multicast address generated in step S402, to the router apparatus 302. The network switch 109, which is connected to the communication apparatus 100, supports the MLD snooping, and thus the transmission of the multicast listener report results in a desired multicast packet delivered to a port connected to the communication apparatus 100.

In step S404, the communication apparatus 100 transmits a neighbor discovery packet to the multicast address. The neighbor discovery packet is for neighbor discovery for the interface address registered in step S401.

In step S405, the communication apparatus 100 starts the duplicate address detection timer. More specifically, duplicate address detection time is set. This is because a predetermined period of standby time is required for receiving a neighbor advertising packet corresponding to the neighbor discovery packet transmitted in step S404.

In step S406, the communication apparatus 100 checks whether the neighbor advertising packet, which is corresponding to the neighbor discovery packet transmitted in step S404, has been received. In a case where the corresponding neighbor advertising packet has been received (YES in step S406), the interface address registered in step S401 is determined to be the same as another address of another communication apparatus and cannot be used for the communications, and the processing proceeds to step S409.

In step S409, the communication apparatus 100 invalidates the registered interface address, and the processing ends.

In a case where no corresponding neighbor advertising packet has been received in step S406 (NO in step S406), the processing proceeds to step S407. In step S407, the communication apparatus 100 determines whether the duplicate address detection timer (set duplicate address detection time) started in step S405 has expired. In a case where the timer has not expired yet (NO in step S407), the processing returns to step S406. In a case where the timer has expired (YES in step S407), the interface address registered in step S401 is determined to be the same with none of the addresses of the other communication apparatuses, and the processing proceeds to step S408.

In step S408, the communication apparatus 100 validates the interface address registered in step S401, and the processing ends. The flow of processing executed when a link local address is registered is described in the present exemplary embodiment. Alternatively, the address to be registered can be a global address.

(Interface Address Deletion Processing in Normal Mode)

Figure 5:
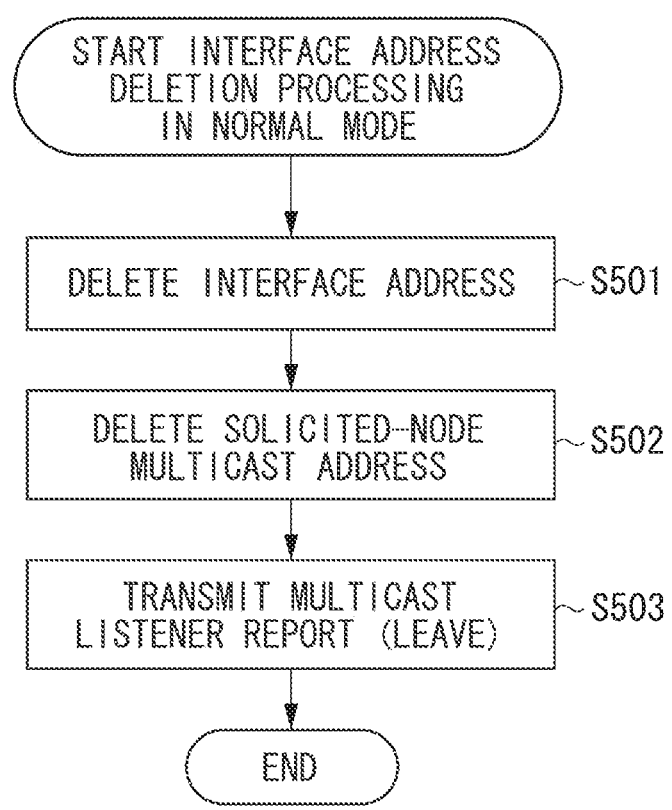
FIG. 5 is a flowchart illustrating interface address deleting processing in the normal power state.

Interface address deletion processing in the normal mode is described with reference to FIG. 5.

The interface address is deleted in response to a user operation or when a valid period of an address that is automatically set expires. When the interface address is to be deleted in response to such reasons, a flow of processing illustrated in FIG. 5 starts.

In step S501, the communication apparatus 100 deletes a registered interface address. When the deletion of the address is completed, the processing proceeds to step S502. In step S502, the communication apparatus 100 deletes a solicited-node multicast address corresponding to the interface address deleted in step S501.

In step S503, the communication apparatus 100 transmits a multicast listener report regarding the solicited-node multicast address deleted in step S502 to the router apparatus 302. This multicast listener report to be transmitted is a report indicating that the apparatus is leaving the multicast group. The network switch 109 connected to the communication apparatus 100 supports the MLD snooping. Thus, the router apparatus 302 stops sending, to a port connected to the communication apparatus 100, a packet addressed to the deleted solicited-node multicast address.

<Processing in Power Saving Mode>

A flow of processing in the power saving mode is described with reference to FIG. 6. When the communication apparatus 100 transitions to the power saving mode, the wake-up timer is set (starts), and then the processing proceeds to step S601.

In step S601, the communication apparatus 100 generates a shortened solicited-node multicast address with the lower 32 bits of the interface address in the normal mode, and holds the address. The lower bits for generating the shortened address can be other than the lower 32 bits.

In step S602, the communication apparatus 100 checks whether the wake-up timer has expired. In a case where the timer has expired (YES in step S602), the transition to the normal power state (normal mode) occurs. In a case where the timer has not expired yet (NO in step S602), the processing proceeds to step S603.

In step S603, the communication apparatus 100 determines whether a packet has been received. In a case where a packet has not been received (NO in step S603), the processing returns to step S602, and whether the wake-up timer has expired continues to be determined. In a case where a packet has been received (YES in step S603), the processing proceeds to step S604.

In step S604, the communication apparatus 100 determines whether the packet thus received (hereinafter, referred to as a "received packet") is a multicast listener query packet. In a case where the received packet is determined not to be a multicast listener query packet (NO in step S604), the processing proceeds to step S605. In a case where the received packet is determined to be a multicast listener query packet (YES in step S604), the processing proceeds to step S607.

In step S605, the communication apparatus 100 determines whether the received packet is a packet requiring the communication apparatus 100 to start and transition to the normal power state. In a case where the received packet is not a packet requiring the wake up (NO in step S605), the processing proceeds to step S606. In a case where the received packet requires the wake up (YES in step S605), the transition to the normal power state occurs. Thus, in step S605, whether to cause the transition to the power saving state to the normal power state is determined based on the content of the received packet.

In step S606, the communication apparatus 100 performs processing of the received packet. After step S606, the processing returns to step S602.

In step S607, the communication apparatus 100 determines whether the multicast address attached to the received multicast listener query packet is an unspecified address (0::0) or matches the solicited-node multicast address generated in step S601. A 128-bit solicited-node multicast address to be the solicited-node multicast address used in such comparison is restored from the 32-bit solicited-node multicast address. In a case where the attached multicast address is not the unspecified address or does not match the solicited-node multicast address (NO in step S607), the processing returns to step S602. In a case where the attached multicast address is an unspecified address or matches the solicited-node multicast address (YES in step S607), the processing proceeds to step S608.

In step S608, the communication apparatus 100 determines whether a version of the protocol used for transmitting the received multicast listener query packet is 2. The version 2 is different from a version 1 in a parameter format. In a case where the protocol version is (YES in step S608), the processing proceeds to step S609. In a case where the protocol version is not 2 (NO in step S608), the processing proceeds to step S611.

In step S611, the communication apparatus 100 calculates maximum delay time based on maximum response delay attached to the multicast listener query packet, and sets (calculates) a multicast listener report transmission time point with a random value between 0 and the maximum delay time. After step S611, the processing proceeds to step S612.

In step S609, the communication apparatus 100 determines whether the number of sources, which is attached to the multicast listener query packet, is 0. In a case where the number of sources is not 0 (NO in step S609), the apparatus does not need to respond to the packet, and thus processing returns to step S602. In a case where the number of sources is 0 (YES in step S609), the processing proceeds to step S610.

In step S610, the communication apparatus 100 calculates the maximum delay time based on a maximum response code attached to the multicast listener query packet, and sets (calculates) the multicast listener report transmission time point with a random value between 0 and the maximum delay time. After step S610, the processing proceeds to step S612.

In step S612, the communication apparatus 100 sets a multicast listener report (maintain) transmission timer based on the multicast listener report transmitted time point determined in step S610 or step S611, and the processing returns to step S602.

The maximum response delay attached to the multicast listener query packet and the maximum response code attached to the multicast listener query packet can be regarded as maximum response delay information on the multicast listener query packet.

<Processing Executed when Multicast Listener Report (Maintain) Transmission Timer Starts>

Figure 7:
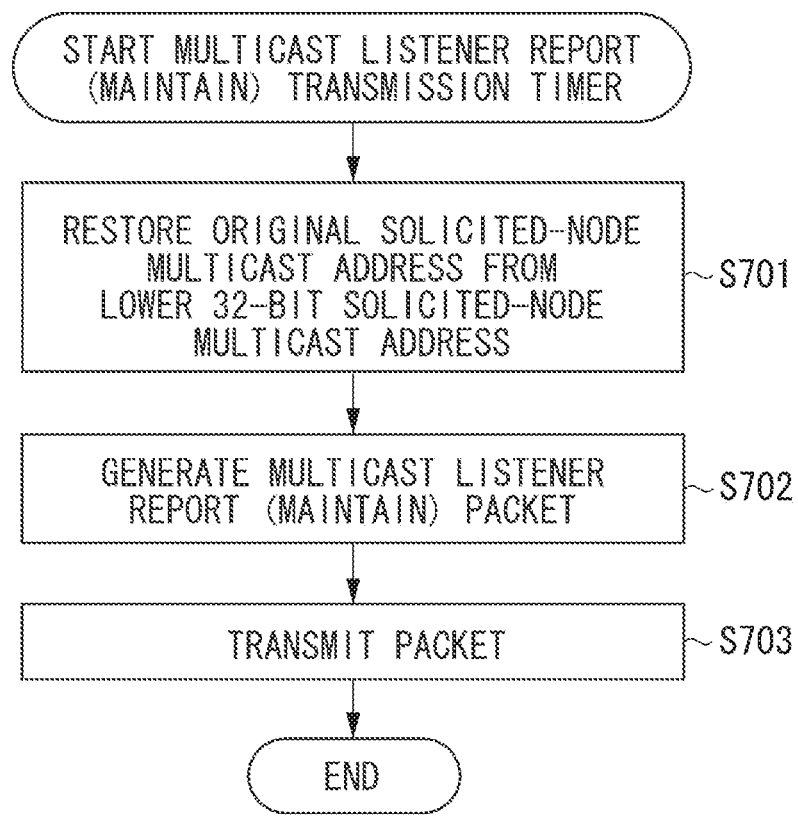
FIG. 7 is a flowchart illustrating transmission timer start processing in the power saving mode according to the first exemplary embodiment.

A flow of processing executed when the multicast listener report (maintain) transmission timer starts is described with reference to FIG. 7. The network communication unit 101 executes steps in the flowchart illustrated in FIG. 7.

In step S701, the communication apparatus 100 restores the 128-bit solicited-node multicast address from the lower 32-bit solicited-node multicast address generated in step S601. In other words, the original solicited-node multicast address is restored.

In step S702, the communication apparatus 100 generates a multicast listener report (maintain) packet from the solicited-node multicast address restored in step S701.

In step S703, the communication apparatus 100 transmits the packet generated in step S702 to the router apparatus 302, and the processing ends.

<Effects of First Exemplary Embodiment>

The communication apparatus 100 can respond to the multicast listener query also in the power saving mode. The communication apparatus 100 that has received the multicast listener query packet in the power saving mode can transmit the multicast listener report to the source of the multicast listener query packet. Thus, management of the multicast group can be appropriately performed in the communication apparatus 100 having the power saving mode.

The communication apparatus 100 transmits the multicast listener report (maintain) only when the multicast address of the multicast listener query packet matches the solicited-node multicast address of the multicast group joined by the communication apparatus 100.

The power saving mode is a state where the user is not operating the communication apparatus 100. Thus, no interface address is added or deleted by the user in this state.

As described above, the communication apparatus 100 according to the present exemplary embodiment can maintain the multicast group (multicast address) with a smaller power consuming resource in the power saving mode. Thus, the communication apparatus 100 in the power saving mode according to the present exemplary embodiment can maintain the multicast address more effectively and with a lower risk of failure.

<Modification>

The disclosure can be applied to any apparatuses other than that according to the exemplary embodiment described above, as long as the apparatus can operate in a plurality of modes with different levels of power consumption and has a communication function for receiving the multicast listener query packet.

Figure 6:
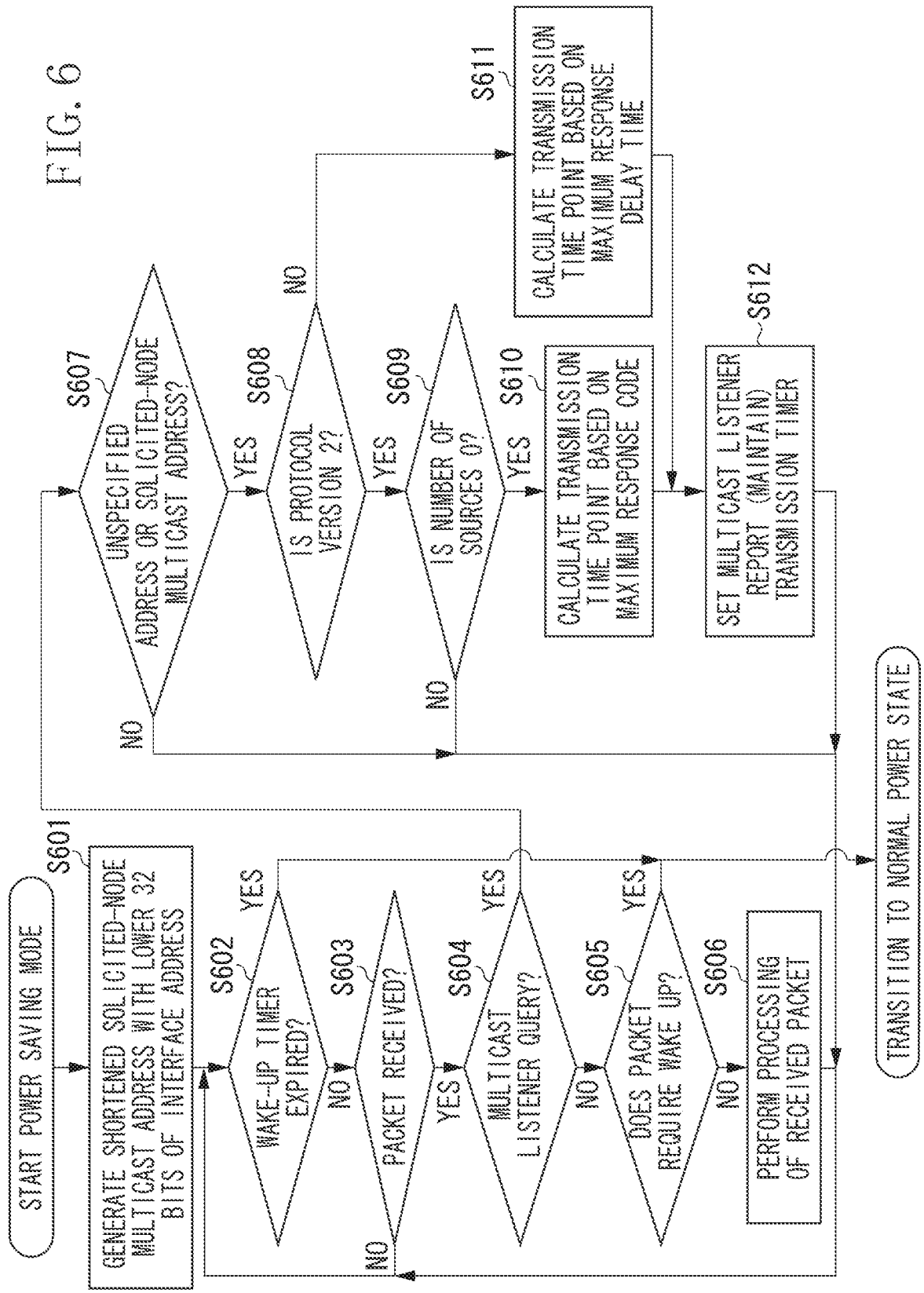
FIG. 6 is a flowchart illustrating processing in a power saving mode according to the first exemplary embodiment.

The processing in the flowchart illustrated in FIG. 6 can be implemented in an order different from that in the illustrated example. For example, step S601 (generation of the solicited-node multicast address) can be executed between steps S604 and S607. Step S602 (determination on whether the wake-up timer has expired) can be executed after step S606.

In the exemplary embodiment described above, the multicast group includes the communication apparatus 100 and the PC 301. Alternatively, the multicast group can further include an apparatus other than the communication apparatus 100 and the PC 301.

In the exemplary embodiment described above, an example where the multicast listener query packet is transmitted to the communication apparatus 100 is described. Alternatively, a signal other than a packet may be used as long as the signal (multicast listener query signal) is for the multicast listener query.

In the exemplary embodiment described above, the communication protocol is IPv6. However, the protocol used in the disclosure is not limited to IPv6. The power saving mode can be a sleep mode. The normal power mode can be an awake mode.

FIG. 1 illustrates a part of the configuration of the communication apparatus 100 with functional blocks (e.g. the power saving mode control unit 103, the communication control unit 104, and the protocol processing unit 107). However, the configuration illustrated in FIG. 1 is merely exemplary, and one of the functional blocks can be implemented with a plurality of functional blocks, or any of the functional blocks can be divided into blocks executing a plurality of functions. At least one of the functional blocks can be implemented as hardware. When a functional block is implemented with hardware, for example, a predetermined compiler can be used to automatically generate a dedicated circuit on a Field Programmable Gate Array (FPGA) from a program for implementing each step. A Gate Array circuit can be generated in a manner that is the same as that in the case of the FPGA, and implemented as hardware. The functional block can also be implemented with an Application Specific Integrated Circuit (ASIC).

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-012852, filed Jan. 27, 2017, which is hereby incorporated by reference herein in its entirety.

What is claimed is:

1. A communication apparatus having a first state and a second state involving smaller power consumption than in the first state, the communication apparatus comprising:
   one or more processors; and
   one or more memories storing a program that, when executed by the one or more processors, cause the one or more processors to function as:
   a reception unit configured to receive a signal from outside in the second state,
   a first determination unit configured to determine whether the received signal is a multicast listener query signal,
   a second determination unit configured to determine, in a case where the received signal is determined to be the multicast listener query signal, whether a multicast address of the multicast listener query signal matches a predetermined address of a multicast group joined by the communication apparatus,
   a transmission unit configured to transmit, in a case where the multicast address is determined to match the predetermined address, a multicast receiver report to a source of the multicast listener query signal,
   a third determination unit configured to determine a version of a protocol used for transmitting the multicast listener query signal, and
   a first setting unit configured to set a transmission time point of the multicast receiver report based on maximum response delay information on the multicast listener query signal, in a case where the version of the protocol used for transmitting the multicast listener query signal is 1,
   wherein the transmission unit transmits the multicast receiver report to the source of the multicast listener query signal, based on a determination result obtained by the second determination unit and a determination result obtained by the third determination unit, and
   wherein the transmission unit transmits the multicast receiver report at the transmission time point set by the first setting unit.

2. The communication apparatus according to claim 1, wherein the one or more processors further function as:
   a fourth determination unit configured to determine whether the number of sources of the multicast listener query signal is 0, in a case where the version of the protocol used for transmitting the multicast listener query signal is 2; and
   a second setting unit configured to set a transmission time point of the multicast receiver report based on maximum response delay information on the multicast listener query signal, in a case where the number of sources of the multicast listener query signal is determined to be 0,
   wherein the transmission unit transmits the multicast receiver report at the transmission time point set by the second setting unit, in a case where the number of sources of the multicast listener query signal is determined to be 0.

3. The communication apparatus according to claim 1, wherein a multicast receiver report indicating termination of multicast reception by the communication apparatus and a multicast receiver report indicating a change in the multicast group joined by the communication apparatus are transmitted in the first state.

4. The communication apparatus according to claim 1, wherein the one or more processors further function as a takeover unit configured to take over information on the multicast group joined in the first state to be used in the second state, in a case where the first state transitions to the second state.

5. The communication apparatus according to claim 1, wherein the predetermined address of the multicast group is a solicited-node multicast address of the multicast group joined by the communication apparatus.

6. The communication apparatus according to claim 1, wherein the information on the multicast group is lower 32 bits of an interface address in the first state.

7. The communication apparatus according to claim 1, wherein the one or more processors further function as a generation unit configured to restore the solicited-node multicast address from the lower 32 bits of the interface address and generate the multicast receiver report from the restored solicited-node multicast address.

8. The communication apparatus according to claim 1, wherein the one or more processors further function as a transition unit configured to cause, in a case where a signal received in the second state is not the multicast listener query signal, transition from the second state to the first state based on a content of the signal.

9. The communication apparatus according to claim 1, wherein the transmission unit transmits the multicast receiver report to a source of the multicast listener query signal, in a case where a multicast address of the multicast listener query signal is an unspecified address.

10. The communication apparatus according to claim 1, wherein the one or more processors further function as a transition unit configured to cause transition from the second state to the first state, in a case where the received signal is not the multicast listener query signal.

11. A method for controlling a communication apparatus having a first state and a second state involving smaller power consumption than in the first state, the method comprising:
  determining whether a signal received in the second state is a multicast listener query signal;
  determining, in a case where the received signal is determined to be the multicast listener query signal, whether a multicast address of the multicast listener query signal matches a predetermined address of a multicast group joined by the communication apparatus;
  transmitting, in a case where the multicast address is determined to match the predetermined address, a multicast receiver report to a source of the multicast listener query signal;
  determining a version of a protocol used for transmitting the multicast listener query signal; and
  setting a transmission time point of the multicast receiver report based on maximum response delay information on the multicast listener query signal, in a case where the version of the protocol used for transmitting the multicast listener query signal is 1,
  wherein transmitting comprises transmitting the multicast receiver report to the source of the multicast listener query signal, based on a determination result obtained by the second determination unit and a determination result obtained by the third determination unit, and
  wherein transmitting comprises transmitting the multicast receiver report at the transmission time point set by the setting.

12. A non-transitory computer-readable storage medium storing a program for causing a communication apparatus having a first state and a second state involving smaller power consumption than in the first state to perform operations comprising:
  determining whether a signal received in the second state is a multicast listener query signal;
  determining, in a case where the received signal is determined to be the multicast listener query signal, whether a multicast address of the multicast listener query signal matches a predetermined address of a multicast group joined by the communication apparatus;
  transmitting, in a case where the multicast address is determined to match the predetermined address, a multicast receiver report to a source of the multicast listener query signal;
  determining a version of a protocol used for transmitting the multicast listener query signal; and
  setting a transmission time point of the multicast receiver report based on maximum response delay information on the multicast listener query signal, in a case where the version of the protocol used for transmitting the multicast listener query signal is 1,
  wherein transmitting comprises transmitting the multicast receiver report to the source of the multicast listener query signal, based on a determination result obtained by the second determination unit and a determination result obtained by the third determination unit, and
  wherein transmitting comprises transmitting the multicast receiver report at the transmission time point set by the setting.

13. A communication apparatus having a first state and a second state involving smaller power consumption than in the first state, the communication apparatus comprising:
  one or more processors; and
  one or more memories storing a program that, when executed by the one or more processors, cause the one or more processors to function as:
    a reception unit configured to receive a signal from outside in the second state,
    a first determination unit configured to determine whether the received signal is a multicast listener query signal,
    a second determination unit configured to determine, in a case where the received signal is determined to be the multicast listener query signal, whether a multicast address of the multicast listener query signal matches a predetermined address of a multicast group joined by the communication apparatus,
    a transmission unit configured to transmit, in a case where the multicast address is determined to match the predetermined address, a multicast receiver report to a source of the multicast listener query signal, and
    a takeover unit configured to take over information on the multicast group joined in the first state to be used in the second state, in a case where the first state transitions to the second state,
  wherein the information on the multicast group is lower 32 bits of an interface address in the first state.

14. The communication apparatus according to claim 13, wherein a multicast receiver report indicating termination of multicast reception by the communication apparatus and a multicast receiver report indicating a change in the multicast group joined by the communication apparatus are transmitted in the first state.

15. The communication apparatus according to claim 13, wherein the one or more processors further function as a generation unit configured to restore the solicited-node multicast address from the lower 32 bits of the interface address and generate the multicast receiver report from the restored solicited-node multicast address.

16. The communication apparatus according to claim 13, wherein the one or more processors further function as a transition unit configured to cause, in a case where a signal received in the second state is not the multicast listener query signal, transition from the second state to the first state based on a content of the signal.

17. The communication apparatus according to claim 13, wherein the transmission unit transmits the multicast receiver report to a source of the multicast listener query signal, in a case where a multicast address of the multicast listener query signal is an unspecified address.

18. The communication apparatus according to claim 13, wherein the one or more processors further function as a transition unit configured to cause transition from the second state to the first state, in a case where the received signal is not the multicast listener query signal.

19. A method for controlling a communication apparatus having a first state and a second state involving smaller power consumption than in the first state, the method comprising:
  determining whether a signal received in the second state is a multicast listener query signal;
  determining, in a case where the received signal is determined to be the multicast listener query signal, whether a multicast address of the multicast listener query signal matches a predetermined address of a multicast group joined by the communication apparatus;

transmitting, in a case where the multicast address is determined to match the predetermined address, a multicast receiver report to a source of the multicast listener query signal; and taking over information on the multicast group joined in the first state to be used in the second state, in a case where the first state transitions to the second state, wherein the information on the multicast group is lower 32 bits of an interface address in the first state.

20. A non-transitory computer-readable storage medium storing a program for causing a communication apparatus having a first state and a second state involving smaller power consumption than in the first state to perform operations comprising:

determining whether a signal received in the second state is a multicast listener query signal;

determining, in a case where the received signal is determined to be the multicast listener query signal, whether a multicast address of the multicast listener query signal matches a predetermined address of a multicast group joined by the communication apparatus;

transmitting, in a case where the multicast address is determined to match the predetermined address, a multicast receiver report to a source of the multicast listener query signal; and taking over information on the multicast group joined in the first state to be used in the second state, in a case where the first state transitions to the second state, wherein the information on the multicast group is lower 32 bits of an interface address in the first state.

* * * * *